US010846108B1

(12) United States Patent
Chung et al.

(10) Patent No.: US 10,846,108 B1
(45) Date of Patent: Nov. 24, 2020

(54) PROVIDING LIMITED ACCESS WITHIN A PRIVATE NETWORK

(71) Applicant: Amazon Technologies, Inc., Seattle, WA (US)

(72) Inventors: Peter Chung, Lynnwood, WA (US); Jason Falivene, Edmonds, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 56 days.

(21) Appl. No.: 16/019,534

(22) Filed: Jun. 26, 2018

(51) Int. Cl.
| *G06F 15/16* | (2006.01) |
| *G06F 9/451* | (2018.01) |
| *H04L 29/06* | (2006.01) |
| *G06F 8/61* | (2018.01) |
| *G06F 21/56* | (2013.01) |
| *G06F 21/44* | (2013.01) |
| *G06F 9/455* | (2018.01) |

(52) U.S. Cl.
CPC ............ *G06F 9/452* (2018.02); *G06F 8/61* (2013.01); *G06F 9/45558* (2013.01); *G06F 21/44* (2013.01); *G06F 21/562* (2013.01); *H04L 63/0272* (2013.01); *H04L 63/102* (2013.01); *H04L 63/20* (2013.01); *H04L 65/608* (2013.01); *G06F 2221/2141* (2013.01)

(58) Field of Classification Search
CPC ... H04L 63/0272; H04L 53/102; H04L 63/20; H04L 65/608; G06F 9/452; G06F 8/61; G06F 9/45558; G06F 21/44; G06F 21/562; G06F 2221/2141
See application file for complete search history.

(56) References Cited

U.S. PATENT DOCUMENTS

| 7,428,754 | B2 * | 9/2008 | Neumann | G06F 21/32 380/280 |
| 8,195,153 | B1 * | 6/2012 | Frencel | G06F 11/1456 340/995.24 |
| 8,200,547 | B2 * | 6/2012 | Daman | G06Q 30/08 705/26.3 |
| 8,495,183 | B2 * | 7/2013 | Tukol | G06F 9/44505 709/220 |
| 8,560,818 | B2 * | 10/2013 | Tukol | G06F 9/44505 713/1 |
| 8,725,997 | B2 * | 5/2014 | Tukol | G06F 9/44505 713/2 |
| 8,751,778 | B2 * | 6/2014 | Tukol | H04L 41/0886 713/1 |
| 8,769,059 | B1 * | 7/2014 | Chheda | H04L 41/0866 705/26.5 |
| 8,825,990 | B2 * | 9/2014 | Tukol | G06F 9/4406 713/1 |
| 8,880,638 | B2 * | 11/2014 | Jeswani | H04L 67/2842 709/214 |

(Continued)

*Primary Examiner* — Moustafa M Meky
(74) *Attorney, Agent, or Firm* — Thomas | Horstemeyer, LLP

(57) ABSTRACT

Disclosed are various embodiments for providing limited access within a private network. A connection request is received from a client device coupled to a public network. A remote desktop environment is implemented in a private network in response to the connection request. Access to the public network through the remote desktop environment may be restricted to communicating with a particular storage service.

20 Claims, 5 Drawing Sheets

(56) References Cited

U.S. PATENT DOCUMENTS

| | | | | |
|---|---|---|---|---|
| 8,938,524 B2* | 1/2015 | Tukol | ................ | G06F 9/44505 |
| | | | | 709/221 |
| 8,954,574 B1* | 2/2015 | Chheda | ............... | G06Q 20/085 |
| | | | | 709/220 |
| 9,037,633 B2* | 5/2015 | Tukol | ................ | G06F 9/4451 |
| | | | | 709/203 |
| 9,124,667 B2* | 9/2015 | Tukol | ...................... | H04L 12/66 |
| 9,178,759 B2* | 11/2015 | Tukol | ................ | H04L 41/0803 |
| 9,183,010 B2* | 11/2015 | Tukol | ................ | H04L 41/0806 |
| 9,197,502 B1* | 11/2015 | Chheda | ............... | G06Q 20/085 |
| 9,219,648 B1* | 12/2015 | Chheda | ............... | G06Q 20/085 |
| 9,407,502 B2* | 8/2016 | Tukol | ................ | G06F 9/44505 |
| 9,455,871 B1* | 9/2016 | Chheda | ............... | G06Q 20/085 |
| 9,626,710 B1* | 4/2017 | Chheda | ............. | G06Q 30/0631 |
| 10,025,671 B2* | 7/2018 | Bryant | ................ | G06F 11/079 |
| 2013/0339470 A1* | 12/2013 | Jeswani | ............. | H04L 67/1097 |
| | | | | 709/213 |
| 2018/0039548 A1* | 2/2018 | Bryant | ............... | G06F 11/1451 |

* cited by examiner

PROVIDING LIMITED ACCESS WITHIN A PRIVATE NETWORK

BACKGROUND

Organizations may maintain a private network with internal systems that is separate from a public-facing network that is accessible via the Internet. A gateway or firewall controls interconnection between the private network and the public network. Systems on the private network may be accessible from the Internet using a tunneled connection, which may be referred to as a virtual private network (VPN). Typically, only trusted users are given VPN access to a private network.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
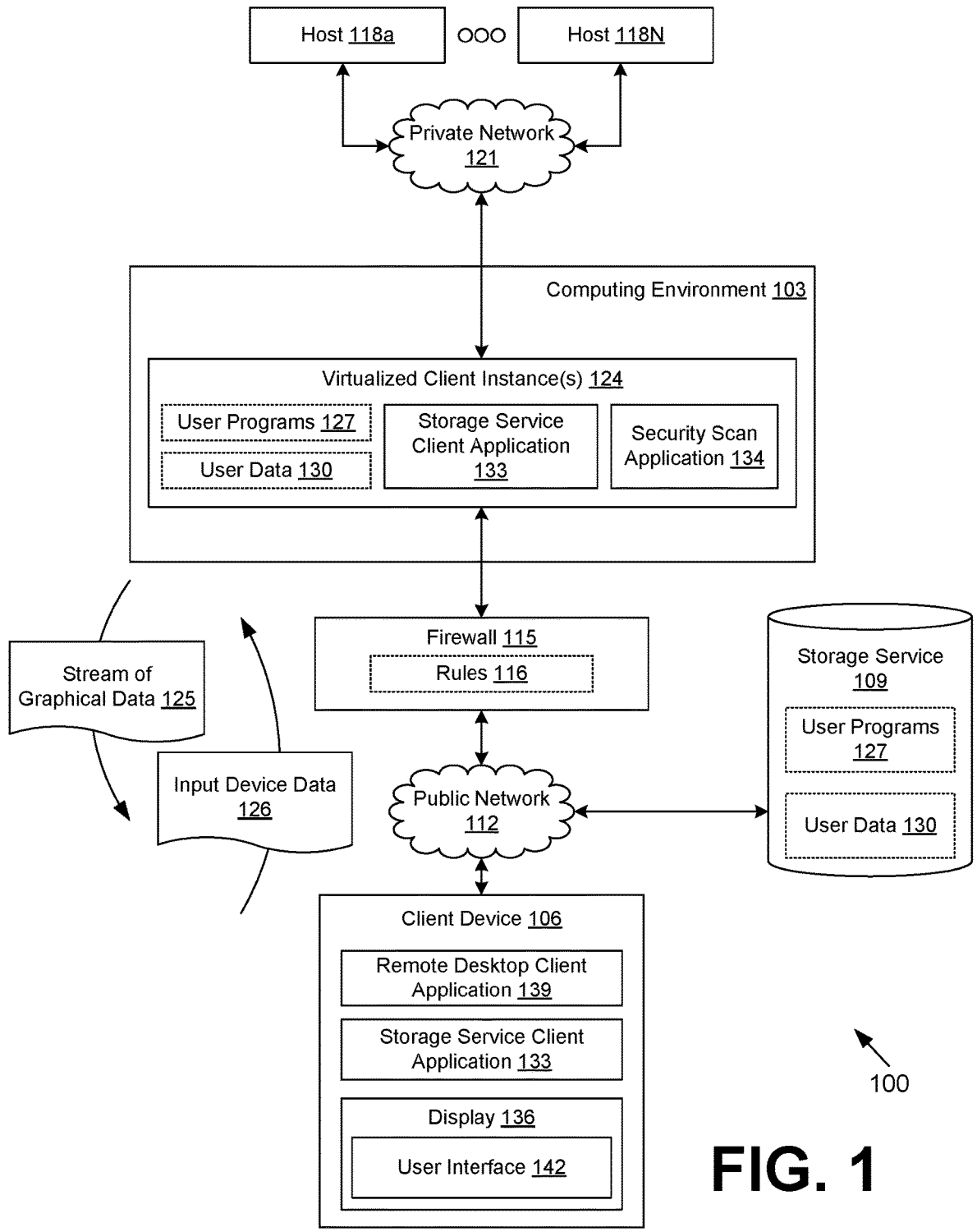
FIG. 1 is a schematic block diagram of a networked environment according to various embodiments of the present disclosure.

The present disclosure relates to approaches for providing limited access within a private network. Virtual private networks (VPNs) enable organizations to grant access to their private networks from the public Internet. For security purposes, only trusted individuals are given VPN access (e.g., employees who are working remotely out of the office). Moreover, the organization may require that the trusted individuals use trusted client hardware in order to access the VPN. For example, the organization may require that the client hardware comply with a security policy and be managed by the information technology staff of the organization to ensure that the client hardware is not susceptible to malware.

However, for various reasons, an organization may need to grant access to their private network to certain individuals who may be using untrusted hardware. For example, the organization may need to grant access to third-party vendors providing support for customized hardware. While the individuals working for the vendors may be considered trusted, they may use client hardware that is not considered trusted. The client hardware may execute viruses or other malware unknown to the vendor. Yet, it may be impractical for the organization to control or manage the client hardware that the vendors use.

Various embodiments of the present disclosure introduce approaches for granting limited access within a private network to users of untrusted client hardware. A user connects using an untrusted client device via a tunnel to a virtualized client instance. The virtualized client instance provides a remote desktop capability, where the graphical interface is encoded and sent over the network to the untrusted client device, and the untrusted client device sends pointing device and keyboard input over the network to the virtualized client instance.

The virtualized client instance is provided with access to the private network, but public network access from the virtualized client instance may be restricted. In one embodiment, the virtualized client instance may be restricted to access only a particular storage service on the public network. The user may then be able to download and install software from the particular storage service, but with the other restrictions, malware is unlikely to be inadvertently installed. Further, even if malware were installed on the virtualized client instance, data exfiltration to the public network from the virtualized client instance would be prevented.

As one skilled in the art will appreciate in light of this disclosure, certain embodiments may be capable of achieving certain advantages, including some or all of the following: (1) improving computer network security by avoiding permitting third parties to connect to a private network with untrusted and potentially compromised systems in order to perform necessary functions, (2) improving the efficiency of the computer by executing user programs on virtualized client infrastructure that may be closer to the systems they manage within a network topology, thereby reducing latency and permitting scalable amounts of processing and memory resources to be applied to the user programs, (3) improving the efficiency of the computer by providing potentially multiple external users access to a single virtualized client instance upon which a management program is installed, thereby avoiding the installation and execution of the management program on multiple client devices, (4) improving flexibility by facilitating the installation and execution of arbitrary user programs within a private network without the requirement of administrative supervision, and so forth. In the following discussion, a general description of the system and its components is provided, followed by a discussion of the operation of the same.

With reference to FIG. 1, shown is a networked environment 100 according to various embodiments. The networked environment 100 includes a computing environment 103, a client device 106, and a storage service 109 in data communication via a public network 112. The public network 112 includes, for example, the Internet, intranets, extranets, wide area networks (WANs), local area networks (LANs), wired networks, wireless networks, cable networks, satellite networks, or other suitable networks, etc., or any combination of two or more such networks. A firewall 115 may be interposed between the computing environment 103 and the public network 112 and configured to enforce rules 116.

The computing environment 103 may also be in data communication with a plurality of hosts 118a . . . 118N via a private network 121. The private network 121 may be controlled or managed by a particular organization or enterprise and may operate in private network address space. The private network 121 includes, for example, intranets, wide area networks (WANs), local area networks (LANs), wired networks, wireless networks, cable networks, satellite networks, or other suitable networks, etc., or any combination of two or more such networks. Additional firewalls 115 may be interposed between the computing environment 103 and the hosts 118 on the private network 121 in some embodiments.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various functionality may be executed in the computing environment 103 according to various embodiments. Also, various data may be stored in a data store that is accessible to the computing environment 103. The components executed on the computing environment 103, for example, include virtualized client instances 124 and other services, processes, systems, engines, or functionality not discussed in detail herein.

The virtualized client instances 124 correspond to virtual machine instances that are configured to replicate a desktop or client environment. To this end, the virtualized client instances 124 may be configured to execute an operating system such as MICROSOFT WINDOWS, LINUX, ANDROID, etc. However, in various implementations, multiple virtualized client instances 124 may execute concurrently on a single computing device in the computing environment 103, managed by a hypervisor. A user interacts remotely with the virtualized client instances 124 using a remote desktop environment and protocol such as PC-over-IP (PCoIP) such that a stream of graphical data 125 corresponding to a graphical user interface of the virtualized client instance 124 is sent to the client device 106 of the user, and input device data 126 generated by the user is sent from the client device 106 to the virtualized client instance 124. The input device data 126 may include mouse pointer data, touchpad data, touchscreen data, keyboard data, and so forth.

The virtualized client instances 124 provide a special-purpose managed remote desktop environment coupled to the private network 121 to allow an external user to have access to one or more hosts 118 connected to the private network 121. To maintain network security, access within the private network 121 may be restricted to specific hosts 118 for a particular virtualized client instance 124. For example, a network reflector may be used to redirect all network traffic to the private network 121 from the virtualized client instance 124 to the specific host(s) 118. In addition, the firewall 115 restricts the virtualized client instances 124 from communicating over the public network 112 except as to remote desktop data and as to communication with the storage service 109. In some cases, the virtualized client instance 124 is executed within a virtual private network within the private network 121 for each user identity or third-party organization in order to enhance security.

Communication with the storage service 109 is intended to be a mechanism to move user programs 127 and user data 130 to the virtualized client instance 124 in a way that avoids unintentional installation of malware or other software that could pose a threat to the private network 121. The virtualized client instances 124 may execute a storage service client application 133 in order to communicate with the storage service 109. In various implementations, the storage service client application 133 may be a special-purpose client application or may be a generic application such as a web browser.

In various implementations, the virtualized client instances 124 may execute a security scan application 134 that scans the user programs 127 and/or the user data 130 for compliance with a security policy. For example, the security scan application 134 may scan the user programs 127 and/or user data 130 for malware, software defects, disallowed system calls, disallowed network calls, and so on, based on a security policy of the organization. The security scan application 134 may perform a static analysis of the user programs 127 and/or the user data 130. Alternatively, or additionally, the security scan application 134 may perform a dynamic analysis of the user programs 127 by executing the user programs 127 in a monitored environment to observe the behavior of the user programs 127 when executed. Although the security scan application 134 is shown as executed in the virtualized client instance 124, the security scan application 134 may be executed elsewhere in the computing environment 103 or in the storage service 109 in other embodiments.

The storage service 109 is a network-based storage system that allows users to upload files to a reference location (known as a "bucket") and to download the files at a later time. The storage service 109 may be operated by the proprietor of the computing environment 103 or by a third party. In some cases, the storage service 109 may be reachable both through the public network 112 and through the private network 121. As shown in FIG. 1, the storage service 109 may store user programs 127 and user data 130 uploaded by a client device 106 for download through a virtualized client instance 124. The storage service 109 may communicate via hypertext transfer protocol (HTTP), HTTP secure (HTTPS), file transfer protocol (FTP), or other protocols.

The client device 106 is representative of a plurality of client devices 106 that may be coupled to the public network 112. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 106 may include a display 136. The display 136 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a remote desktop client application 139, a storage service client application 133, and/or other applications. The remote desktop client application 139 is executed to facilitate remote control of and interaction with a virtualized client instance 124. The remote desktop client application 139 receives input device data 126 generated by a user at the client device 106 and sends the input device data 126 to the virtualized client instance 124. In return, the remote desktop client application 139 receives a stream of graphical data 125 from the virtualized client instance 124 and renders the stream of graphical data 125 as a user interface 142 on the display 136. The remote desktop client application 139 may use a protocol such as remote desktop protocol (RDP), PCoIP, or other protocols.

The storage service client application 133 is executed to facilitate uploading of data such as the user data 130 and/or the user programs 127 from the client device 106 to the storage service 109. The client device 106 may be configured to execute applications beyond the remote desktop client application 139 and the storage service client application 133 such as, for example, web browsers, email applications, social networking applications, word processors, spreadsheets, and/or other applications.

Figure 2:
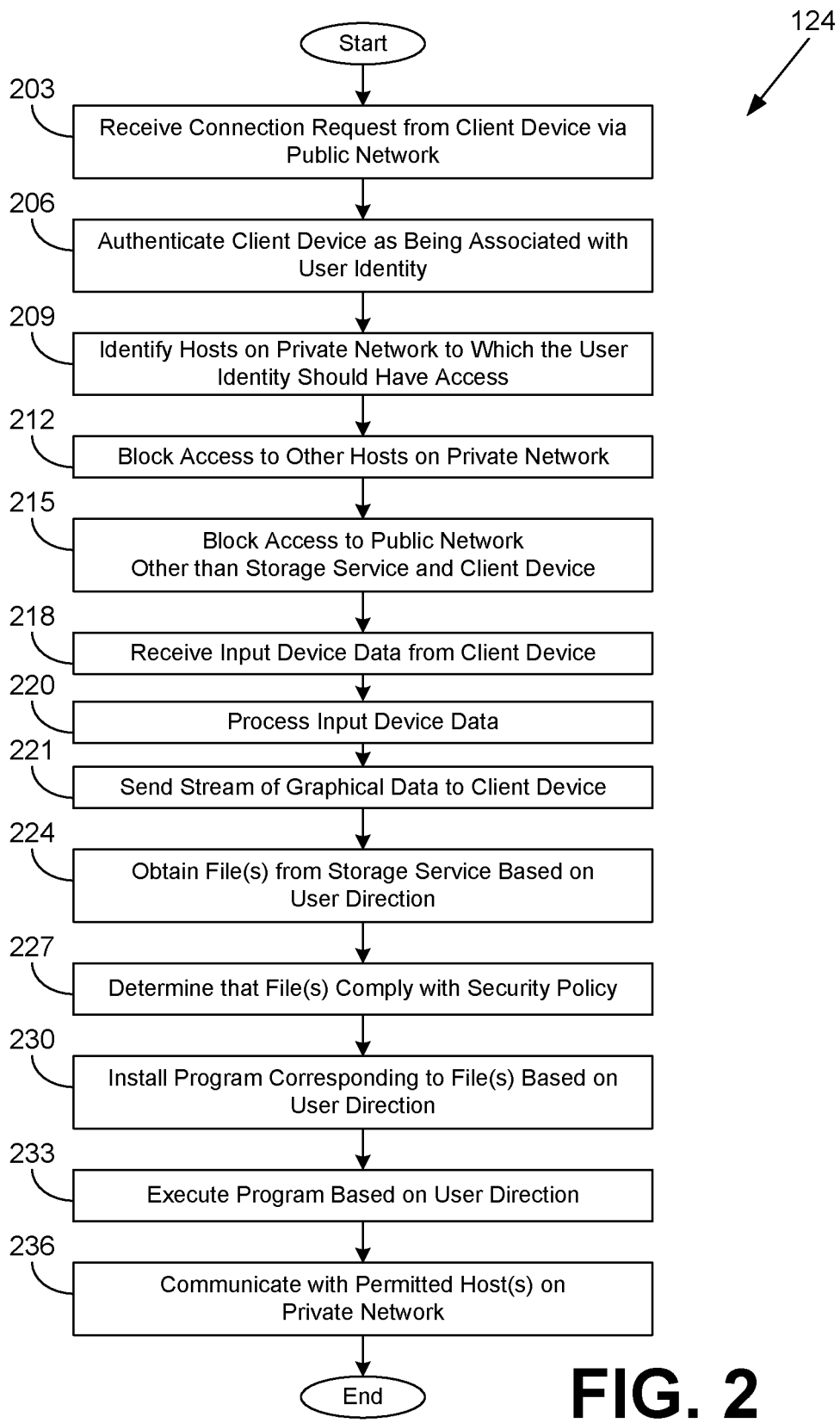
FIG. 2 is a flowchart illustrating one example of functionality implemented as portions of the virtualized client instance executed in a computing environment in the networked environment of FIG. 1 according to various embodiments of the present disclosure.

Referring next to FIG. 2, shown is a flowchart that provides one example of the operation of a portion of the virtualized client instance 124 according to various embodiments. It is understood that the flowchart of FIG. 2 provides merely an example of the many different types of functional arrangements that may be employed to implement the operation of the portion of the virtualized client instance 124 as described herein. As an alternative, the flowchart of FIG. 2 may be viewed as depicting an example of elements of a method implemented in the computing environment 103 (FIG. 1) according to one or more embodiments.

Beginning with box 203, the virtualized client instance 124 receives a connection request from a client device 106 (FIG. 1) via a public network 112 (FIG. 1). The connection request may be received through a firewall 115 (FIG. 1), which is configured by the rules 116 (FIG. 1) to allow connection requests from the client device 106 to pass through. For example, a network address range corresponding to the client device 106 may be added to a whitelist. In some scenarios, the client device 106 may connect to the virtualized client instance 124 from the public network 112 by way of a virtual private network (VPN) tunnel.

In box 206, the virtualized client instance 124 authenticates the client device 106 as being associated with a particular user identity. For example, the client device 106 may provide security credentials such as a username, a password, an identification number, a key, etc., which then may be verified as being correct. In box 209, the virtualized client instance 124 determines hosts 118 (FIG. 1) on the private network 121 (FIG. 1) to which the user identity should have access. For example, the user identity may correspond to a vendor who may need access to maintain programmable logic controllers on one or more particular hosts 118.

In box 212, the virtualized client instance 124 blocks access from the virtualized client instance 124 to hosts 118 on the private network 121 other than those identified in box 209. For example, the virtualized client instance 124 may restrict access to network addresses outside a particular subnetwork. The virtualized client instance 124 may configure a virtual private network (VPN) with access only to those hosts 118 identified in box 209.

In box 215, the virtualized client instance 124 blocks access from the virtualized client instance 124 to the public network 112 other than to the storage service 109 (FIG. 1) or the remote desktop communication with the client device 106. Although boxes 212 and 215 discuss actions taken by the virtualized client instance 124 to block network access, it is understood that the actions may be taken by firewalls, routers, and/or other network devices in the private network 121.

In box 218, the virtualized client instance 124 receives input device data 126 (FIG. 1) from the client device 106. The user at the client device 106 may manipulate various input devices, such as keyboards and mice or other pointing devices, and this input data is sent to the virtualized client instance 124. The virtualized client instance 124 processes the input device data 126 at box 220. For example, the virtualized client instance 124 may provide the corresponding input data to applications executing within the virtualized client instance 124. In box 221, the virtualized client instance 124 sends a stream of graphical data 125 (FIG. 1) to the client device 106, where the stream of graphical data 125 shows a graphical user interface that has been updated in response to the input device data 126. The tasks of boxes 218 through 221 may be repeated numerous times during a session and in parallel with the succeeding tasks.

In box 224, the virtualized client instance 124 obtains one or more files from a storage service 109 in response to a user direction received via the input device data 126. To this end, the virtualized client instance 124 may retrieve user programs 127 (FIG. 1) and/or user data 130 (FIG. 1) via the storage service client application 133 (FIG. 1). The file(s) may be stored in a data store of the virtualized client instance 124.

In box 227, the virtualized client instance 124 determines that the file(s) comply with a security policy of the organization operating the computing environment 103. In this regard, the security scan application 134 (FIG. 1) may scan the file(s) for malware or other improper code. Alternatively, or additionally, the security scan application 134 may execute the file(s) in a monitored environment to observe that no improper network activity or resource usage occurs. If the file(s) do not comply with the security policy, the virtualized client instance 124 may block installation of the file(s) on the virtualized client instance 124.

Assuming that the file(s) do comply, the virtualized client instance 124 then installs a user program 127 corresponding to the file(s) based at least in part on a user direction represented in the input device data 126 in box 230. In box 233, the virtualized client instance 124 executes the user program 127 based at least in part on a user direction represented in the input device data 126. In box 236, the virtualized client instance 124 allows the executed user program 127 to communicate with one or more permitted hosts 118 on the private network 121. For example, the user program 127 executed on the virtualized client instance 124 may communicate with the hosts 118 via proprietary protocols in order to manage the hosts 118. Thereafter, the operation of the portion of the virtualized client instance 124 ends.

In some scenarios, no user program 127 is necessary to manage the hosts 118. For example, in some embodiments, a host 118 may include a web server and a web-based management interface. Accordingly, a user may manage the host 118 by executing a web browser on the virtualized client instance 124 and connecting to the web server of the host 118. The web browser may be preinstalled on the virtualized client device 124, which may make access to the storage service 109 unnecessary. In such scenarios, all access to the public network 112 other than the remote desktop traffic to the client device 106 may be blocked.

Figure 3:
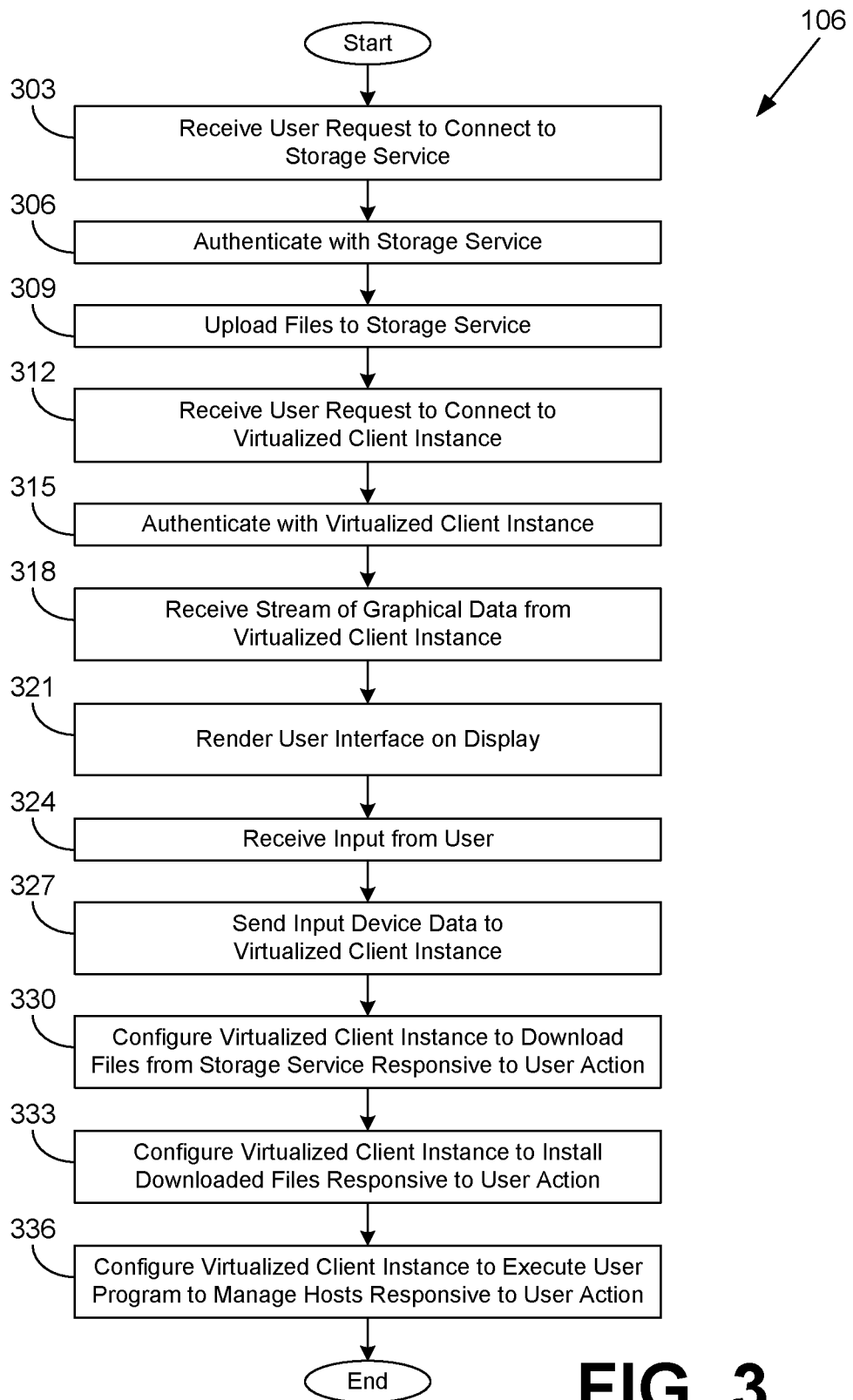
FIG. 3 is a flowchart illustrating one example of functionality implemented as portions of the client device 106 in the networked environment of FIG. 1 according to various embodiments of the present disclosure.

Moving on to FIG. 3, shown is a flowchart that provides one example of the operation of a portion of the client device 106 according to various embodiments. It is understood that the flowchart of FIG. 3 provides merely an example of the many different types of functional arrangements that may be employed to implement the operation of the portion of the client device 106 as described herein. As an alternative, the flowchart of FIG. 3 may be viewed as depicting an example of elements of a method implemented in the client device 106 according to one or more embodiments.

Beginning with box 303, the storage service client application 133 (FIG. 1) executed on the client device 106 receives a user request to connect to a storage service 109 (FIG. 1). In box 306, the storage service client application 133 authenticates with the storage service 109 via the public network 112 (FIG. 1). For example, the storage service client application 133 may provide security credentials such as usernames, passwords, keys, etc., which are then verified by the storage service 109. In box 309, the storage service client application 133 uploads files corresponding to user programs 127 (FIG. 1) and/or user data 130 (FIG. 1) to the storage service 109.

In box 312, the remote desktop client application 139 (FIG. 1) executed on the client device 106 receives a user request to connect to a virtualized client instance 124 (FIG. 1). In box 315, the remote desktop client application 139 authenticates with the virtualized client instance 124. For example, the remote desktop client application 139 may obtain from the user and provide security credentials such as a username, a password, an identification number, a key, etc., which then may be verified by the virtualized client instance 124 as being correct.

In box 318, the remote desktop client application 139 receives a stream of graphical data 125 (FIG. 1) from the virtualized client instance 124. In some cases, the stream of graphical data 125 may include audio data. In box 321, the remote desktop client application 139 renders a user interface 142 (FIG. 1) corresponding to the stream of graphical data 125 on the display 136 (FIG. 1).

In box 324, the remote desktop client application 139 receives input from a user by way of a keyboard, mouse, touchpad, touchscreen, microphone, camera, etc. In box 327, the remote desktop client application 139 sends input device data 126 (FIG. 1) corresponding to the input data to the virtualized client instance 124. The tasks of boxes 318 through 327 may be repeated concurrently with the succeeding boxes as input continues to be received from the user and the stream of graphical data is updated.

In box 330, the client device 106 configures the virtualized client instance 124 to download one or more files from the storage service 109 responsive to user action, such as manipulation of a user interface of the storage service client application 133 executed in the virtualized client instance 124. In box 333, the client device 106 configures the virtualized client instance 124 to install a user program 127 (FIG. 1) corresponding to one or more of the downloaded files responsive to user action, such as manipulation of a user interface of the virtualized client instance 124. In box 336, the client device 106 configures the virtualized client instance 124 to execute the installed user program 127 to manage one or more hosts 118 responsive to a user action, such as manipulation of a user interface of the user program 127. Thereafter, the operation of the portion of the client device 106 ends.

Figure 4:
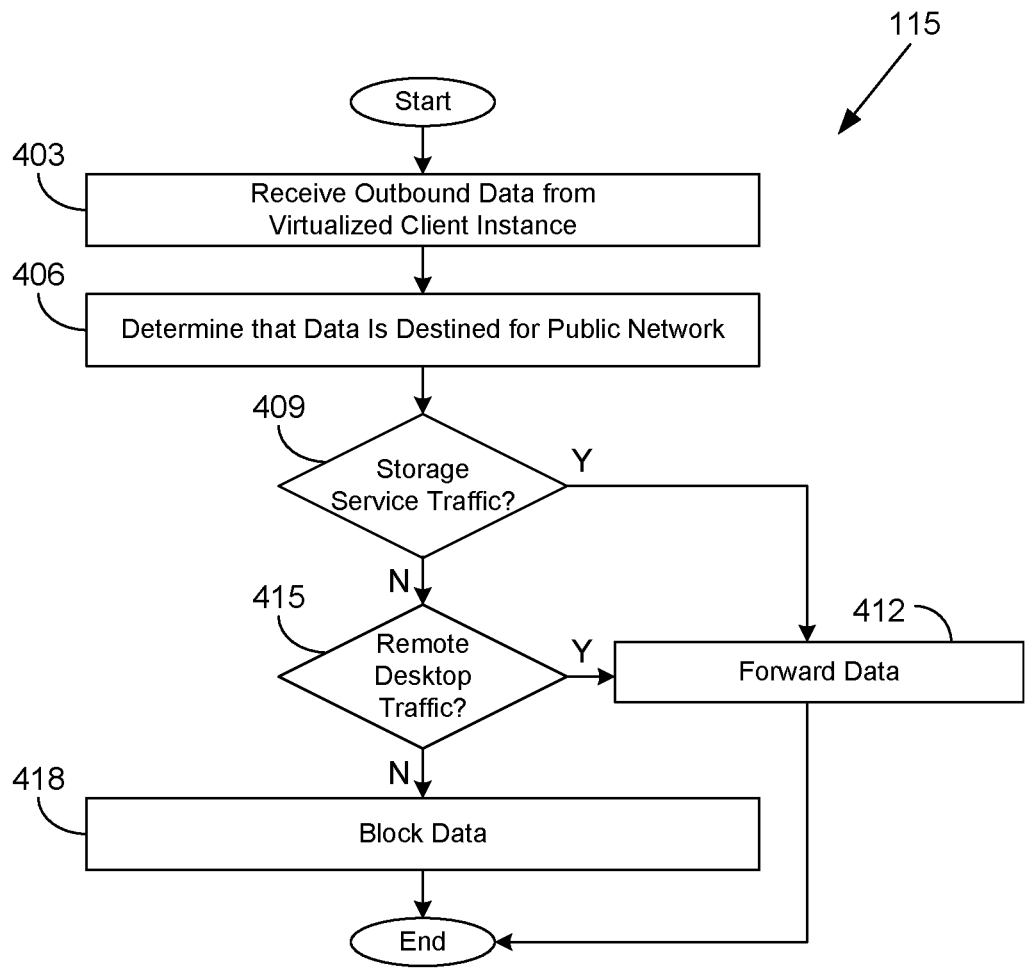
FIG. 4 is a flowchart illustrating one example of functionality implemented as portions of a firewall in the networked environment of FIG. 1 according to various embodiments of the present disclosure.

Turning now to FIG. 4, shown is a flowchart that provides one example of the operation of a portion of the firewall 115 according to various embodiments. It is understood that the flowchart of FIG. 4 provides merely an example of the many different types of functional arrangements that may be employed to implement the operation of the portion of the firewall 115 as described herein. As an alternative, the flowchart of FIG. 4 may be viewed as depicting an example of elements of a method implemented in the computing environment 103 (FIG. 1) according to one or more embodiments.

Beginning with box 403, the firewall 115 receives outbound data from the virtualized client instance 124 (FIG. 1). In box 406, the firewall 115 determines that the data is destined for the public network 112 (FIG. 1). In box 409, the firewall 115 determines whether the data corresponds to traffic to or from the storage service 109 (FIG. 1). If so, the firewall 115 forwards the data in box 412. Thereafter, the operation of the portion of the firewall 115 ends.

In box 415, the firewall 115 determines whether the data corresponds to remote desktop traffic to or from the client device 106. If so, the firewall forwards the data in box 412. Thereafter, the operation of the portion of the firewall 115 ends.

Otherwise, the firewall 115 proceeds from box 415 to box 418 and blocks the data. Blocking the data in this way may prevent exfiltration of sensitive data from the private network 121 (FIG. 1). In some cases, the firewall 115 may allow only downloads from the storage service 109, but not uploads. Thereafter, the operation of the portion of the firewall 115 ends.

Figure 5:
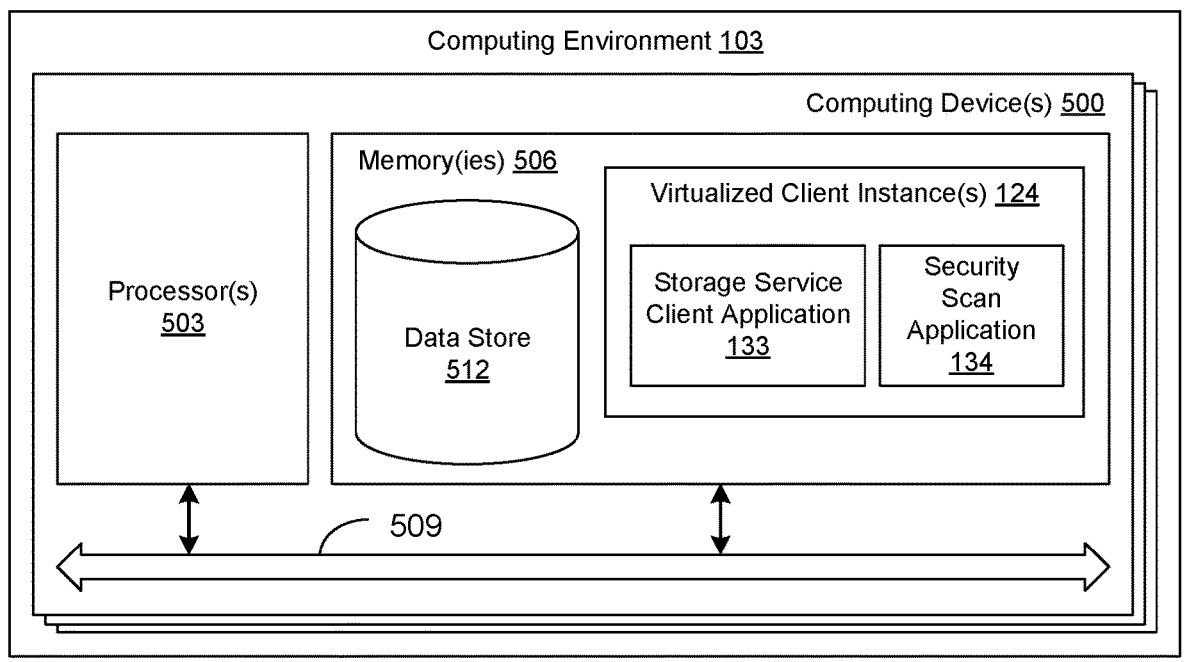
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the virtualized client instances 124 along with the storage service client application 133 and the security scan application 134 executed in the virtualized client instances 124, and potentially other applications. Also stored in the memory 506 may be a data store 512 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores, and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the virtualized client instances 124, the storage service client application 133, the security scan application 134, the remote desktop client application 139, and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2-4 show the functionality and operation of an implementation of portions of the virtualized client instance 124, the client device 106, and the firewall 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the virtualized client instances 124, the storage service client application 133, the security scan application 134, and the remote desktop client application 139, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the virtualized client instances 124, the storage service client application 133, the security scan application 134, and the remote desktop client application 139, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 103.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device coupled to a private network; and
    a virtualized client instance executable in the at least one computing device, wherein when executed the virtualized client instance causes the at least one computing device to at least:
        receive a connection request from a client device coupled to a public network;
        receive input device data from the client device;
        send a stream of graphical data to the client device, the stream of graphical data showing a user interface that is updated in response to the input device data; and
        wherein access of the virtualized client instance to the public network is restricted to receiving the input device data and sending the stream of graphical data.

2. The system of claim 1, wherein the input device data is received and the stream of graphical data is sent using a remote desktop protocol.

3. The system of claim 1, wherein the virtualized client instance is permitted to access a particular storage service via the public network, and when executed the virtualized client instance causes the at least one computing device to at least:
    receive at least one file from the particular storage service; and
    permit a program corresponding to the at least one file to be installed and executed on the virtualized client instance.

4. The system of claim 3, wherein when executed the program causes the virtualized client instance to communicate with at least one host on the private network.

5. The system of claim 4, wherein the at least one host corresponds to a programmable logic controller.

6. The system of claim 4, wherein the program is restricted to communicate only with the at least one host on the private network or a subnetwork of the private network that includes the at least one host.

7. The system of claim 3, wherein when executed the virtualized client instance causes the at least one computing device to at least scan the at least one file to determine whether the at least one file complies with a security policy.

8. The system of claim 3, wherein when executed the virtualized client instance causes the at least one computing device to at least execute the program in a monitored environment to determine whether the program complies with a security policy.

9. The system of claim 1, wherein when executed the virtualized client instance causes the at least one computing device to at least:
    authenticate the client device as being associated with a user identity based at least in part on the connection request;
    determine at least one host on the private network to which the user identity should have access; and
    configure the virtualized client instance to limit access to hosts on the private network other than the at least one host.

10. The system of claim 1, wherein the virtualized client instance is executed in a virtual private network within the private network.

11. A method, comprising:
    receiving, by a virtualized client instance executed via at least one of one or more computing devices coupled to a private network, a connection request from a client device coupled to a public network;
    receiving, by the virtualized client instance executed via at least one of the one or more computing devices, input device data from the client device;
    sending, by the virtualized client instance executed via at least one of the one or more computing devices, a stream of graphical data to the client device, the stream of graphical data showing a user interface that is updated in response to the input device data; and
    wherein access of the virtualized client instance to the public network is restricted to receiving the input device data and sending the stream of graphical data.

12. The method of claim 11, wherein the input device data is received and the stream of graphical data is sent using a remote desktop protocol.

13. The method of claim 11, wherein the virtualized client instance is permitted to access a particular storage service via the public network, and the method further comprises:
    receiving, by the virtualized client instance executed via at least one of the one or more computing devices, at least one file from the particular storage service; and
    permitting, by the virtualized client instance executed via at least one of the one or more computing devices, a program corresponding to the at least one file to be installed and executed on the virtualized client instance.

14. The method of claim 13, further comprising causing, by the program, the virtualized client instance to communicate with at least one host on the private network.

15. The method of claim 14, wherein the program is restricted to communicate only with the at least one host on the private network or a subnetwork of the private network that includes the at least one host.

16. The method of claim 13, further comprising scanning, by the virtualized client instance executed via at least one of the one or more computing devices, the at least one file to determine whether the at least one file complies with a security policy.

17. The method of claim 13, further comprising executing, by the virtualized client instance executed via at least one of the one or more computing devices, the program in a monitored environment to determine whether the program complies with a security policy.

18. The method of claim 11, further comprising:
    authenticating, by the virtualized client instance executed via at least one of the one or more computing devices, the client device as being associated with a user identity based at least in part on the connection request;

determining, by the virtualized client instance executed via at least one of the one or more computing devices, at least one host on the private network to which the user identity should have access; and configuring, via at least one of the one or more computing devices, the virtualized client instance to limit access to hosts on the private network other than the at least one host.

19. The method of claim 11, wherein the virtualized client instance is executed in a virtual private network within the private network.

20. A non-transitory computer-readable medium embodying a virtualized client instance executable in at least one computing device, wherein when executed the virtualized client instance causes the at least one computing device to at least:

receive a connection request from a client device coupled to a public network;

receive input device data from the client device;

send a stream of graphical data to the client device, the stream of graphical data showing a user interface that is updated in response to the input device data; and wherein access of the virtualized client instance to the public network is restricted to receiving the input device data and sending the stream of graphical data.

* * * * *